US008661555B2

(12) United States Patent
Miseldine

(10) Patent No.: US 8,661,555 B2
(45) Date of Patent: Feb. 25, 2014

(54) ROLE-BASED ACCESS CONTROL OVER INSTRUCTIONS IN SOFTWARE CODE

(75) Inventor: Philip Miseldine, Karlsruche (DE)

(73) Assignee: SAP AG, Walldorf (DE)

( * ) Notice: Subject to any disclaimer, the term of this patent is extended or adjusted under 35 U.S.C. 154(b) by 602 days.

(21) Appl. No.: 12/955,735

(22) Filed: Nov. 29, 2010

(65) Prior Publication Data

US 2012/0137373 A1 May 31, 2012

(51) Int. Cl.
*H04L 29/06* (2006.01)

(52) U.S. Cl.
USPC .......... 726/28

(58) Field of Classification Search
USPC .......... 726/28
See application file for complete search history.

(56) References Cited

U.S. PATENT DOCUMENTS 6,014,666 A * 1/2000 Helland et al. .......... 1/1
7,076,798 B2 * 7/2006 Chang et al. .......... 726/4
7,676,831 B2 * 3/2010 Britton et al. .......... 726/5
2003/0144846 A1 * 7/2003 Denenberg et al. .......... 704/277
2004/0177315 A1 * 9/2004 Brown et al. .......... 715/500
2005/0028006 A1 * 2/2005 Leser et al. .......... 713/200
2005/0154888 A1 * 7/2005 Chen et al. .......... 713/168
2005/0229156 A1 * 10/2005 Baumann .......... 717/110
2005/0262549 A1 * 11/2005 Ritt et al. .......... 726/1
2007/0100829 A1 * 5/2007 Allen et al. .......... 707/9
2007/0150935 A1 * 6/2007 Satoh et al. .......... 726/1
2007/0245340 A1 * 10/2007 Cohen et al. .......... 717/174

OTHER PUBLICATIONS

Uwe V. Riss, Alan Rickayzen, and Heiko Maus, "Challenges for Business Process and Task Management," 2007.

* cited by examiner

*Primary Examiner* — Michael S McNally
(74) *Attorney, Agent, or Firm* — Fountainhead Law Group PC

(57) ABSTRACT

In one embodiment, a method determines a role for a user for access to software code. A marker associated with an instruction in the software code is determined. An access level for the user based on the marker and the role is then determined. The access level is enforced based on the instruction associated with the marker for the software code.

20 Claims, 12 Drawing Sheets

File 100

102

```
Public class foo
{
        //interface definition
        public string bar;

        //method interactions
        public void executeSQL(string bar)

        {
                //database code
        }
}
```

File 100

```
//method interactions
public void executeSQL(string bar)

{
        String data = SQLDatabase.Execute(bar);
        System.Out(data);
}
```

File
100

108

```
public void executeSQL(string bar)
{
        SQLDatabase.Execute("SELECT * from Table");
        System.Out(data);
}
```

```
Public class foo
{
        //interface definition
        public string bar;

        //method interactions
        public void executeSQL(string bar) <Marker>

        {
                //database code
        }
}
```

Fig. 3a 210
                                                    212a
303 ⌒ public void executeSQL(string bar) write DBExpert;

210
                                        212b
304 ⌒ Int x = 10 write Architect;

210
                                  212b              212c
306 ⌒ Int x = 10 write architect use developer;

210
                                                    212d
308 ⌒ SQLDatabase b = new SQLDatabase() use DBExpert;

210
                                              212d
310 ⌒ public class SQLDatabase use DBExpert;

210

#NEW_SECURITY_MARKER     212b
312⌒ Declarations.Public write Architect
#END NEW_SECURITY_MARKER

---

210

212b
314⌒ Public class SQLDatabase write Architect
     {
     316⌒ public void foo
          {}
     }

---

210

212b
314⌒ Public class SQLDatabase write Architect
                              212e
     {
     318⌒ public void foo write *
          {}
     }

210

```
Public class foo
{
#NEW_SECURITY_MARKER                    212b
        Declarations.Public write Architect
#END NEW_SECURITY_MARKER

        //interface definition
        public string bar;
                                                  212a
        //method interactions
        public void executeSQL(string bar) write DBExpert

        {
                //database code
        }
}
```

```
Namespace WindowsFormsApplication1
{
        public partial class Form1 : Form
        {
                public Form1 ()
                {
            504         InitializeComponent ();
                        <inserted code>                    506
        [ You are not authorized to edit!! ]

}
                private void Form1_Load(object sender, EventArgs e)
                {

                }
        }

        Public class foo
        {
                //interface definition
                public string bar;

                //method interactions
                public void executeSQL(string bar) write DBExpert

                {
                        //database code
                        SQLDatabase.executeSQL("SELECT * from Table");
                }
        }
}
```

Fig. 5c

ROLE-BASED ACCESS CONTROL OVER INSTRUCTIONS IN SOFTWARE CODE

BACKGROUND

Particular embodiments generally relate to access control.

Unless otherwise indicated herein, the approaches described in this section are not prior art to the claims in this application and are not admitted to be prior art by inclusion in this section.

Access control requires a lot of administrative overhead. This is not only true for run time access of data manipulated and displayed by a software program, but also for the access control of the software development process. For example, software components (e.g., a collection of software artifacts written in a source code) have owners, development managers, and quality managers, who each control various aspects of a software component. Fixing a security issue, for example, may require a quality manager that reviews the mitigation of the security issue to ensure the component is sound.

Also, more objective and abstract access controls exist within development teams. For example, certain portions of the source code of a component may satisfy the functional security requirements of the component, and thus should only be written by the security expert for quality assurance. In another example, the architect may be tasked with explicitly dealing with parts of a component that interact with other components (e.g., external interface/signature design). To ensure that the component operates as defined by the architect in combination with other components, developers with a full understanding of a wider integration and architecture of a system may be limited to modifying these aspects of the component. Each team member that is involved in software development must be able to understand their access rights to source code. The responsibilities in the development may change and adapt frequently. Having a way for a developer to understand whether they are able to adapt a certain portion of source code enables the developers to understand their responsibilities for the component on a technical level. For example, an architect should understand the implications of his/her role within the source code.

Source code management systems may provide access control over who can access the source code of a component on the granularity of files used to store the source code (e.g., class files). For example, FIG. 1*a* shows an example of a software component in a file 100. In file 100, an access control scheme wants to make sure that no developer other than the architect can manipulate the interface of a class foo shown at 102. This may restrict access to public variable definitions. Also, access control may want to ensure that only database experts write code within the executeSQL code block shown at 104. However, because the component is in the same file 100, the different levels of access control that are desired cannot be set. In one example, file 100 may be split and a partial class definition where a single class can be split across multiple files may be used. The multiple files may then be individually controlled. However, splitting a class into multiple files may be inconvenient. Also, the access control is still on the file level.

Typically, to ensure the quality of the component is met, manual reviews of the component, such as the interfaces and the coding of methods, must be made to ensure correctness. This may lead to high overhead in the development lifecycle because potentially anyone could have changed/modified software code.

Also, the above access control over source code may also allow developers to modify parts of the source code in a malicious way. For example, developers may purposely modify parts of the source code to escalate their own privileges within a system, ensure authentication is dropped, or introduce a manual backdoor to the source code. Often, applications may run with different usernames and access rights on a database. This may allow a user to access the database through the application. For example, an application might have access at run time to all sales order records within a database as it logs into the database under a user "database_application_user". A developer, however, may not have privileges to access this database under his/her own username. But, the developer may have access rights to the source code of the application that can execute and access the database. Thus, the developer can manipulate the source code to view the contents of the database when the developer compiles and executes the application.

An example of access to the database that may be written in the source code is shown in FIG. 1*b*. FIG. 1*b* shows an example of database code. In the executeSQL method, a database expert who has knowledge and access to resources manipulated by the software program may write code to manipulate the database as shown at 106. The statement at 106 executes the statement "bar" against the database. A developer who may not have access rights to the database may add a statement to this method that allows access to the database. For example, FIG. 1*c* shows an example of a statement that allows access to a database. At 108, a logical statement of "SELECT * from Table" is added to the method that allows access to the database content (SELECT * from Table). Without any form of access control, a developer may make this modification, compile the software program, and be able to access the database. The developer may then later remove these extra lines of code and any system, such as a version control system, will not notice that the developer added these lines if the lines were never checked in. The software program will just be registered as the executor of the SQL statement of the database of logged files.

SUMMARY

In one embodiment, a method determines a role for a user for access to software code. A marker associated with an instruction in the software code is determined. An access level for the user based on the marker and the role is then determined. The access level is enforced based on the instruction associated with the marker for the software code.

In one embodiment, the marker includes a type of access control and the role. The role is selected from a plurality of roles.

In one embodiment, the method includes adding an indicator to a portion of the software code to indicate the access level.

In one embodiment, the method includes receiving an edit to a portion of the software code covered by the access level and outputting an indicator indicating the edit to the portion of the software code is restricted.

In another embodiment, a non-transitory computer-readable storage medium contains instructions for controlling a computer system to be operable to: determine a role for a user for access to software code; determine a marker associated with an instruction in the software code; determine an access level for the user based on the marker and the role; and enforce the access level based on the instruction associated with the marker for the software code.

In one embodiment, an apparatus includes one or more computer processors and a computer-readable storage medium including instructions for controlling the one or more computer processors to be operable to: determine a role for a user for access to software code; determine a marker associated with an instruction in the software code; determine an access level for the user based on the marker and the role; and enforce the access level based on the instruction associated with the marker for the software code.

The following detailed description and accompanying drawings provide a better understanding of the nature and advantages of the present invention.

BRIEF DESCRIPTION OF THE DRAWINGS

FIG. 1*a* shows an example of a software component in a file.

FIG. 1*b* shows an example of database code.

FIG. 1*c* shows an example of a statement that allows access to a database.

FIG. 3*a* depicts an example of a code block according to one embodiment.

FIG. 5*a* shows an example of determining an access control level for a code block according to one embodiment.

FIG. 5*c* depicts another example of an access control level according to one embodiment.

DETAILED DESCRIPTION

Described herein are techniques for access control. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 2:
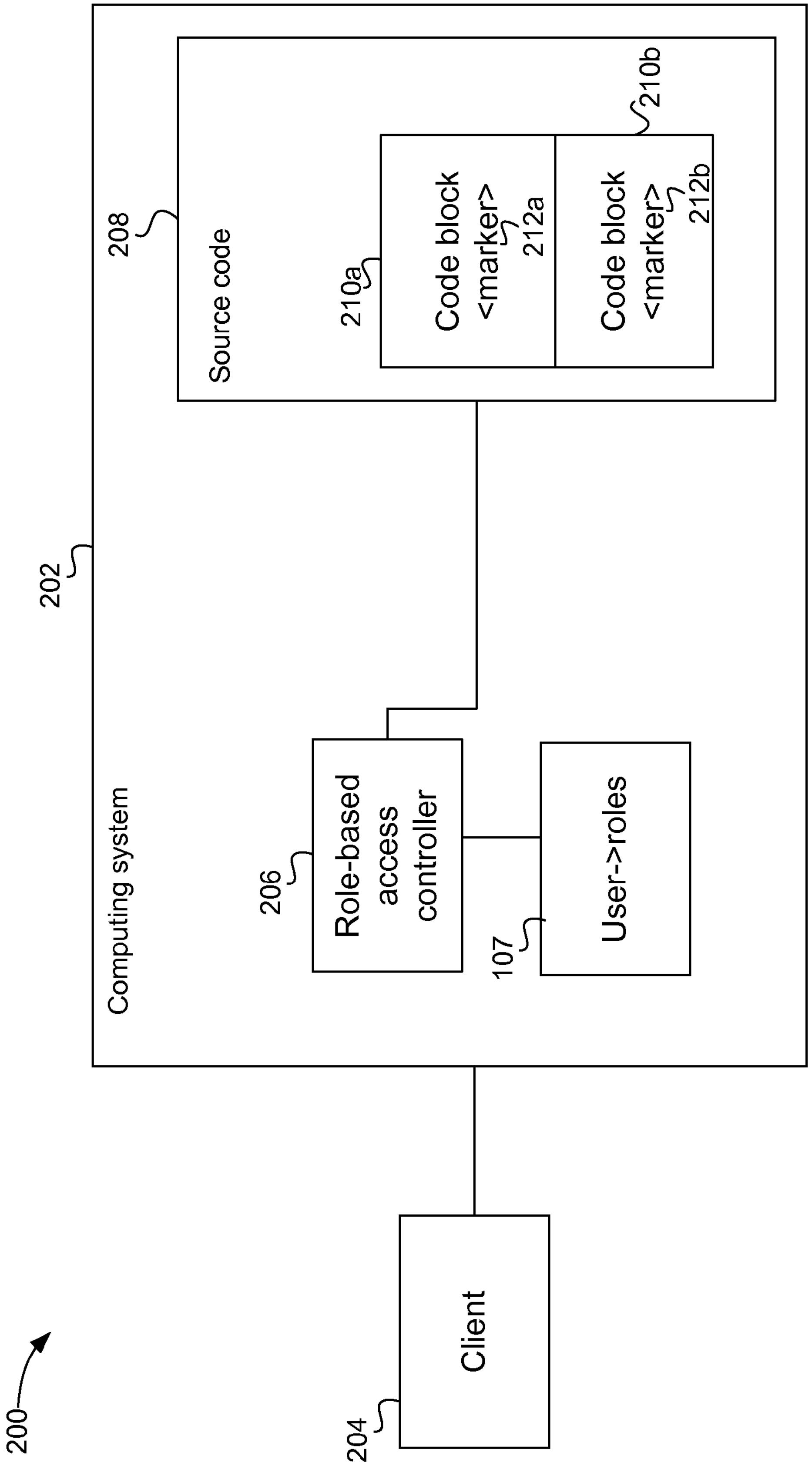
FIG. 2 depicts an example of a system for providing access control according to one embodiment.

FIG. 2 depicts an example of a system 200 for providing access control according to one embodiment. System 200 includes a computing system 202 and a client 204. Computing system 202 includes a role-based access controller 206 and source code 208. Computing system 202 may include multiple computing devices or a single computing device that perform(s) the functions as described herein. Source code 208 may be stored in memory, such as a database, hard disk drive, or other storage devices.

Client 204 may want to access source code 208. For example, a user may want to access source code during a development process of a software application. The user may want to edit, delete, or add source code. Role-based access controller 206 is configured to enforce access to source code 208.

Particular embodiments use markers 212*a-b* that indicate an access rights for roles to access code blocks 210*a-b*. For discussion purposes, a code block 210 may represent a program module, part of a program module, or particular instruction type. Code block 210 may be different levels of code groupings, such a single instruction, a method, a class, or any combination of instructions, or where markers within code denote some code grouping.

Code blocks 110 may include markers 212. Markers 212 may designate the access control for code block 210. For example, marker 212 may be inserted at the instruction level to indicate access control for code block 210. In one example, marker 212 is inserted with an instruction in code block 110 and indicates an access level for a program module, part of a program module, or an instruction type within code block 210. Thus, markers 212 indicate which level of access control is assigned to code block 210. For example, if marker 212 is inserted with an instruction for a method, then marker 212 is used to define access control for that method.

Marker 212 may be an indication, such as a comment, keyword, or symbol, that is inserted into source code 208. For example, a marker, such as "write architect" would indicate that a developer needs to be the architect (or above), otherwise the developer cannot modify code block 210. In one embodiment, marker 212 may not have other functions in the program, such as markers 212 are used in design time, but have no effect on the program during run time. That is, a compiler may ignore markers 212, and markers 212 do not affect the running of the software program.

Markers 212 add semantic meaning to an instruction. For example, marker 212 may be new keywords within a software language or special forms of a comment that may have a semantic understanding to control access. Thus, how access control should be applied to the instruction is determined from marker 212.

Markers 212 may indicate different roles that may classify users (or a group of roles) that can access code block 210. For example, different users may be assigned roles in the development process. The role may be a description of responsibilities a user may be performing in the software development process. For example, the role may be clear functional roles or other differential criteria for a team. Also, localization efforts, where a component is written to ensure it can handle a global deployment effectively, could ensure that terminology or aspects of the component specific to a region can only be modified by users belonging to a role denoted for a particular country or region. For example, a component may communicate an error message and this must be understood in 17 different languages. The component that contains translated error messages for each language may only be accessed by developers for a localization team that has expertise in those languages. Also, roles may be specific to the skills that are being provided by the user. Thus, different users are classified into roles. Also, different roles may be classified into a role.

The roles are then used in enforcing access control. For example, markers 212 may be used to determine which roles can modify code block 210 in which marker 212 is associated. Relationships between users and roles may be stored in a table 207. Role-based access controller 206 may look up a user in table 207 to determine the user's role.

Different degrees of access control can be provided. For example, instead of allowing/denying write access to a certain code block 210, warning messages (at different levels) may be used. The warning messages may be a less expensive way to prevent code modifications by accident or to ensure local compilations of modified code could not occur ("soft access"). Users can decide to trust the development team in certain behaviors, but enforce stricter access in other behaviors. In other examples of access control, modifying code block 210 where access is not allowed could result in a compiler error, or in a warning stating that the user has modified code that he cannot have access to. Further, particular embodiments can also be used to control a copy/paste function or check-in and check-out of source code. This may ensure that code that for legal reasons would not be allowed to be copied from or pasted into source code.

FIG. 3*a* depicts an example of code block 210 according to one embodiment. A marker 212 has been inserted at an instruction at 302 in code block 210. In one embodiment, marker 212 is associated with an instruction for the executeSQL method. Marker 212 may be inserted in code block 210 and associated with an instruction. For example, marker 212 may be inserted on the same line as the instruction in source code 208. Marker 212 may be inserted at other places also. For example, marker 212 may be inserted on a different line, but have a pointer or indication that indicates marker 212 is associated with a specific instruction. Further, marker 212 may be stored separately from code block 210, such as in a table, but be associated with an instruction in code block 210.

Figure 3B:
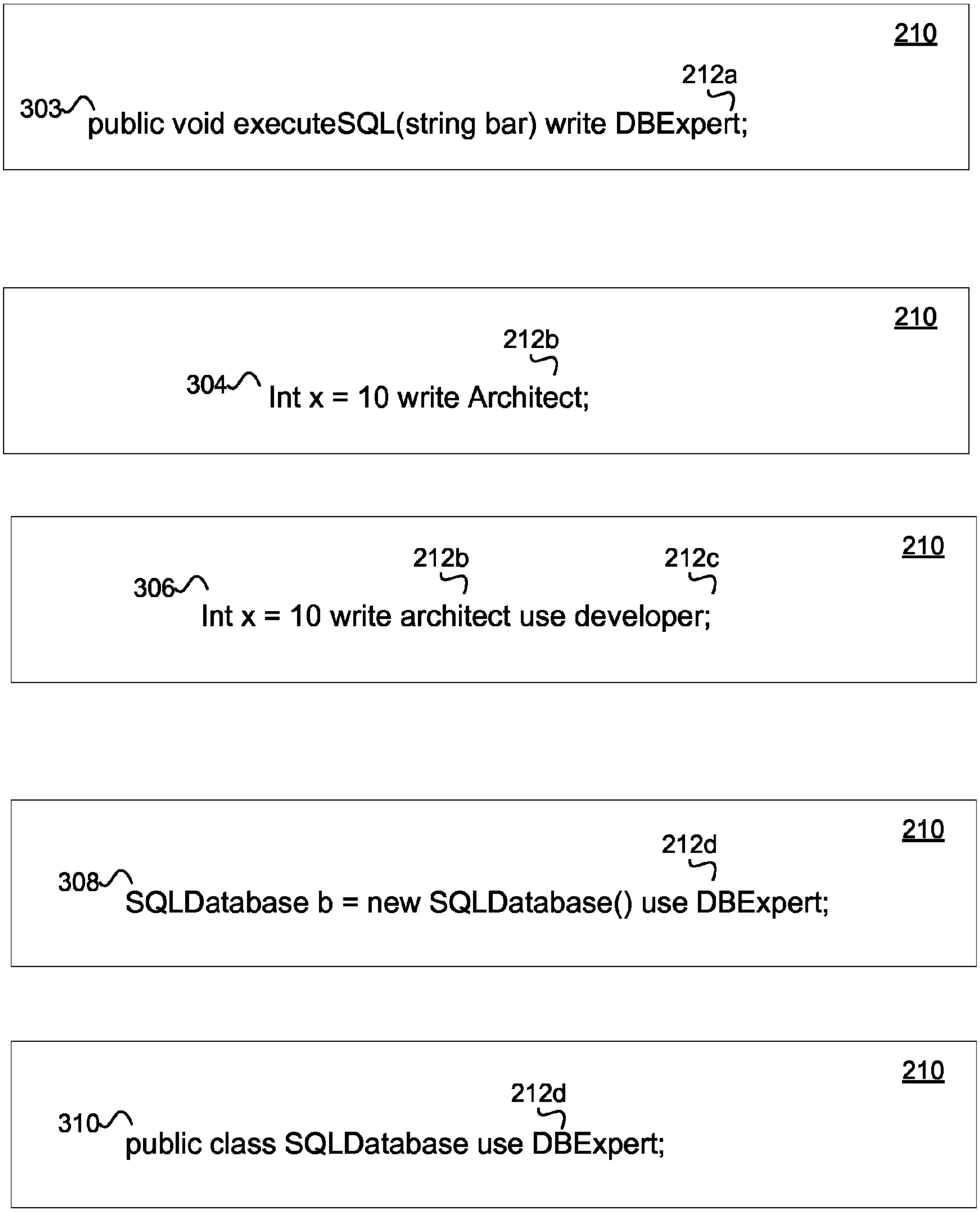
FIGS. 3*b* and 3*c* show examples of different markers according to one embodiment.
Figure 3C:
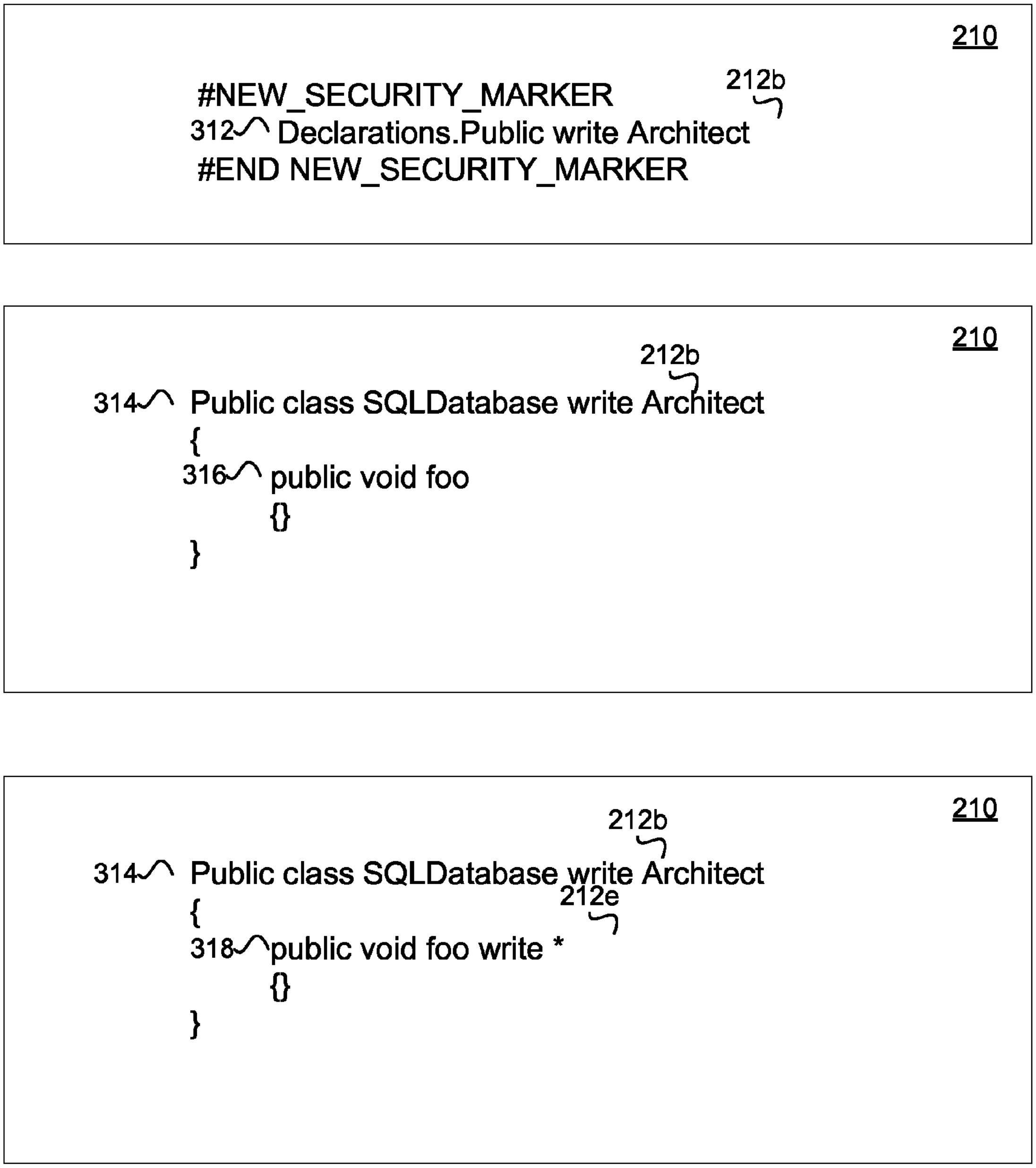

FIGS. 3*b* and 3*c* show examples of different markers 212 according to one embodiment. As shown, marker 212*a* is the keyword "write DBExpert". In one embodiment, the form of marker 212 may be <type of access control> <role>. The type of access control may be what level of access control is enforced. Also, the role is the role that applies to the type. The role may just be the role indicated or may indicate a group of roles. For example, the group of roles may be an architect and any other role with a comparable access level or better. Other forms of markers 212 may also be used.

At 303, the keyword "write" is appended to an instruction for the executeSQL method and is followed by a role (or set of roles) that can modify the method. In this case, the role of "DBExpert" is assigned to the keyword write. The keyword write may indicate the access that is allowed. In this case, the DBExpert is allowed to write to the executeSQL method. Users that are not in the role of DBExpert cannot write to the executeSQL method. The negative may also be indicated, such as marker 212 may indicate the DBExpert cannot write to the executeSQL method. When faced with an instruction (in this example, the method definition), marker 212*a* is considered by role-based access controller 206 and takes a special semantic meaning based on that particular instruction. For example, for a method instruction, this can be at the body signature (i.e., which parameters and its visibility) of a method are controlled.

At 304, a marker 212*b* is used with a different instruction. In this case, the instruction is an integer declaration. The semantic meaning of marker 212*b* in this case may indicate that only an architect can use the integer "x" further in the source code. Also, another marker 212*b* may have the semantic meaning that only the architect may modify the declaration of the integer. Following this, a variety of different markers 212 may be used to distinguish their semantic meaning. For example, at 306, an instruction includes marker 212*b* and a marker 212*c* of "use developer". Markers 212*b* and 112*c* may indicate that only an architect can modify the declaration of the integer x and only developers can actually reference an integer x later on in the software program.

Accordingly, individual instructions may have their usage protected using markers 212. This provides a finer granularity than a file-based access system. For example, one type of access control may be where only a database expert may write instructions that may manipulate a database. The instruction within code block 210 to handle communication to a database may be the instruction SQLDatabase. For example, at 308, a marker 212*d* of "use DBExpert" is used with the instruction SQLDatabase. Marker 212*d* declares that new instructions that contain a reference to database "b" can only be added by users in the role of DBExpert. Also, marker 212*d* may be added to the class definition of SQLDatabase class as shown at 310. In this case, marker 212*d* indicates that any instruction that used an object instantiated from the SQLDatabase class may only be written by a user in a DBExpert role.

Accordingly, access control where only a database expert should be able to manipulate code within the executeSQL method is solved using different markers 212. For example, access can be restricted to objects via a class-based marker 212*d* as shown at 310 or access can be restricted to the method itself via a marker 212*a* on the executeSQL method as shown at 303.

Further, access can be restricted to forms of instructions or types of instructions. For example, if it is desired that only architects should be able to write to the public interface of a class, markers 212 may be written to indicate a form of instruction is restricted. Referring to FIG. 3*c*, at 312, an instruction is associated with marker 212*b* of "write Architect." This indicates that any instruction that declares a public member of a class is restricted to being written by an architect. Thus, a taxonomy of instruction types may be formed and markers 212 are applied to control access to the instruction types.

Inheritance of access rights follow the same relationships present within a language. For example, a method that is part of a class would inherit the same access rights denoted by marker 212 that restrict the class. For example, at 314, an instruction is associated with a marker 212*b* restricts the class SQLdatabase. At 316, the method "foo" would inherit the restrictions of marker 212*b* because it is part of the class SQLdatabase. For example, the method foo inherits the restriction that only an architect can modify its construction. In one embodiment, the inheritance may be manually overwritten by adding new markers directly to counteract the inheritance. For example, at 318, a marker 212*e* of a "*" may override the inheritance and indicate that any user can modify "foo".

Also, if no marker 212 is associated with an instruction in code block 210, in one embodiment, anyone can access code unless the code is controlled by a marker 212 by default.

Figure 4:
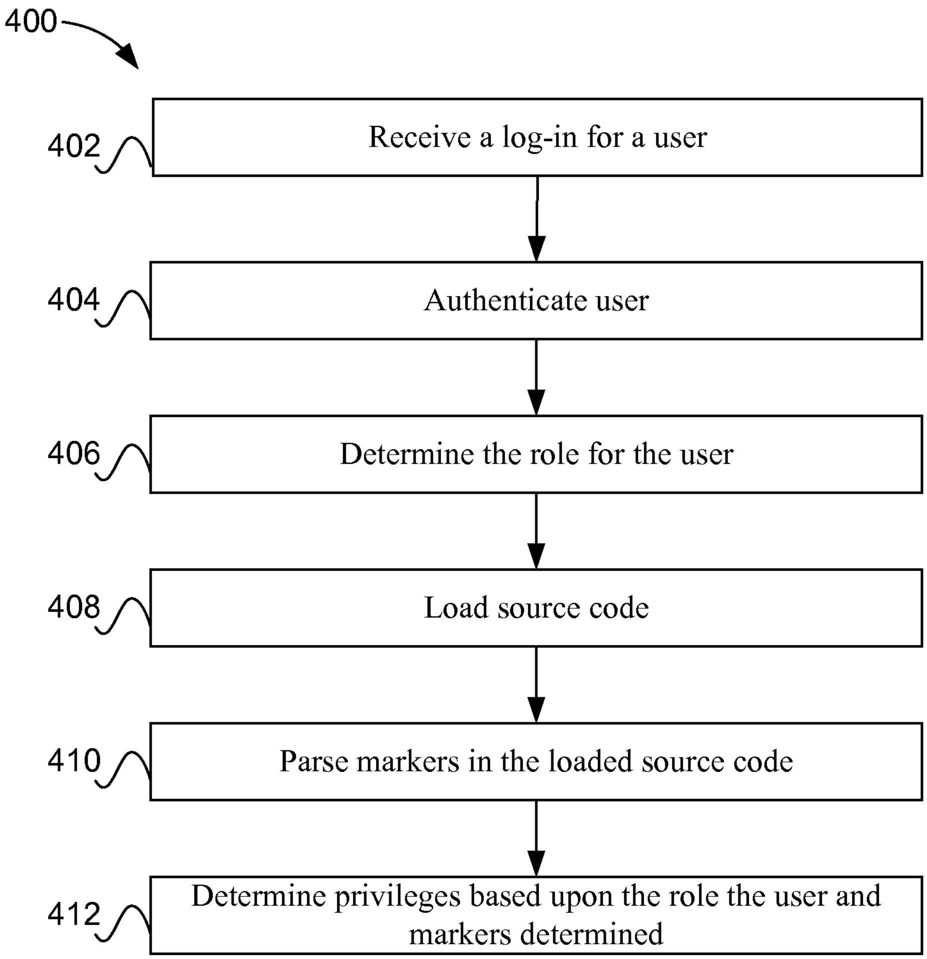
FIG. 4 depicts a simplified flowchart of a method for enforcing access control according to one embodiment.

FIG. 4 depicts a simplified flowchart 400 of a method for enforcing access control according to one embodiment. At 402, role-based access controller 106 receives a log-in for a user. The log-in may be a username that is assigned to the user. At 404, the user is authenticated.

At 406, role-based access controller 206 determines the role for the user. For example, table 207 is accessed and the roles for the user are determined.

At 408, source code 208 is loaded. For example, source code 208 may be loaded from a database or memory from a database. In one embodiment, a portion of source code 208 that is requested by the user is loaded.

At 410, role-based access controller 106 parses markers 112 in the loaded source code 208. For example, role-based access controller 106 may parse the instructions of source code in real time to determine the markers. In other embodiments, the parsing of source code 208 may be performed previously.

At 412, role-based access controller 206 determines access control privileges based upon the role the user and markers 212 determined. For example, based on the source code 208 loaded, different levels of access may be determined based on the privileges afforded by markers 212.

In one embodiment, markers 212 are analyzed with respect to the roles. Then, an access level is determined based on the instruction associated with marker 212. For example, access control may be applied to a class, instruction, or portion of source code 108 based on marker 212.

FIG. 5*a* shows an example of determining an access control level for a code block 210 according to one embodiment. Marker 212*b* of "write architect" and a marker 212*a* of "write DBExpert" are included in block 210. In one example, a user logs in and a role of DBExpert is determined. The role of DBExpert does not include the role of architect. According to markers 212*a* and 212*b*, role-based access controller 206 determines based on the user's role that the user may not create or modify any public declarations based on marker 212*b* and the user's role of DBExpert. Also, role-based access controller 206 determines the user may modify the method executeSQL based on marker 212*a*.

The access control may be communicated to the user in different ways. For example, access violations may be communicated to the user using different colors or symbols, and/or may disable editing of code blocks 210 to restrict access to the user. Also, different levels of enforcement may be provided, such as instead of disabling editing, role-based access controller 206 may make the user aware of the violation in a warning, but may allow modification to occur.

Figure 5B:
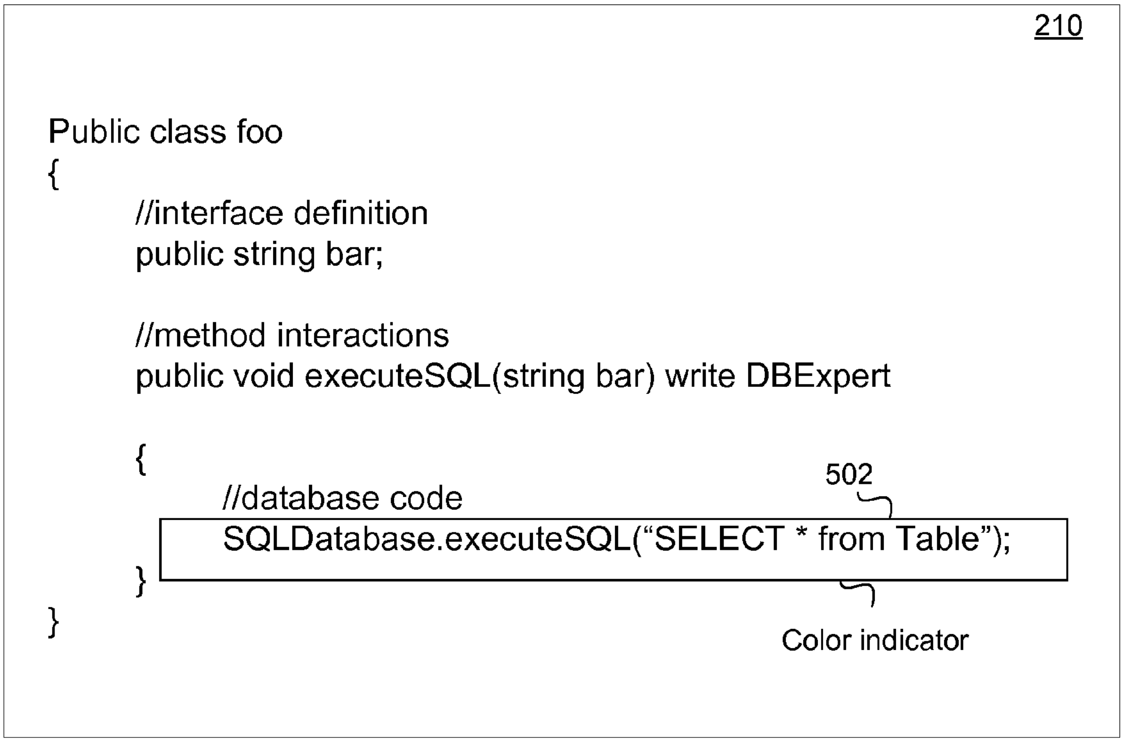
FIG. 5*b* shows an example of access control through disabling of editing according to one embodiment.

Different methods of communicating the different levels of access control will now be described. FIG. 5*b* shows an example of access control through disabling of editing according to one embodiment. In FIG. 5*b*, a color indicator 502 is used to indicate that the executeSQL method cannot be modified by the user. The different color is not shown in FIG. 5*b*, but the box is used to indicate the instruction is displayed as a different color. In this example, the color indicates that the content cannot be modified, but the user can still read its content. In other embodiments, the content may be blocked. Also, other indicators may also be used, such as symbols and shading.

FIG. 5*c* depicts another example of an access control level according to one embodiment. The access control level in FIG. 5*c* may be weaker than the access control level shown in FIG. 5*b*. In this case, at 504, a user has edited the public declaration of class Form1. At 506, a pop-up informs user that it is not allowed to edit this portion of source code 110. Similar pop-ups may also be used at compiler time, such as compiler warnings or compiler errors, to restrict compilation of code. Thus, the user within the DBExpert role may not modify the content of a public declaration and compile it. For example, a message such as "cannot compile class Form1" as you are unauthorized to edit its content may be provided.

Figure 5D:
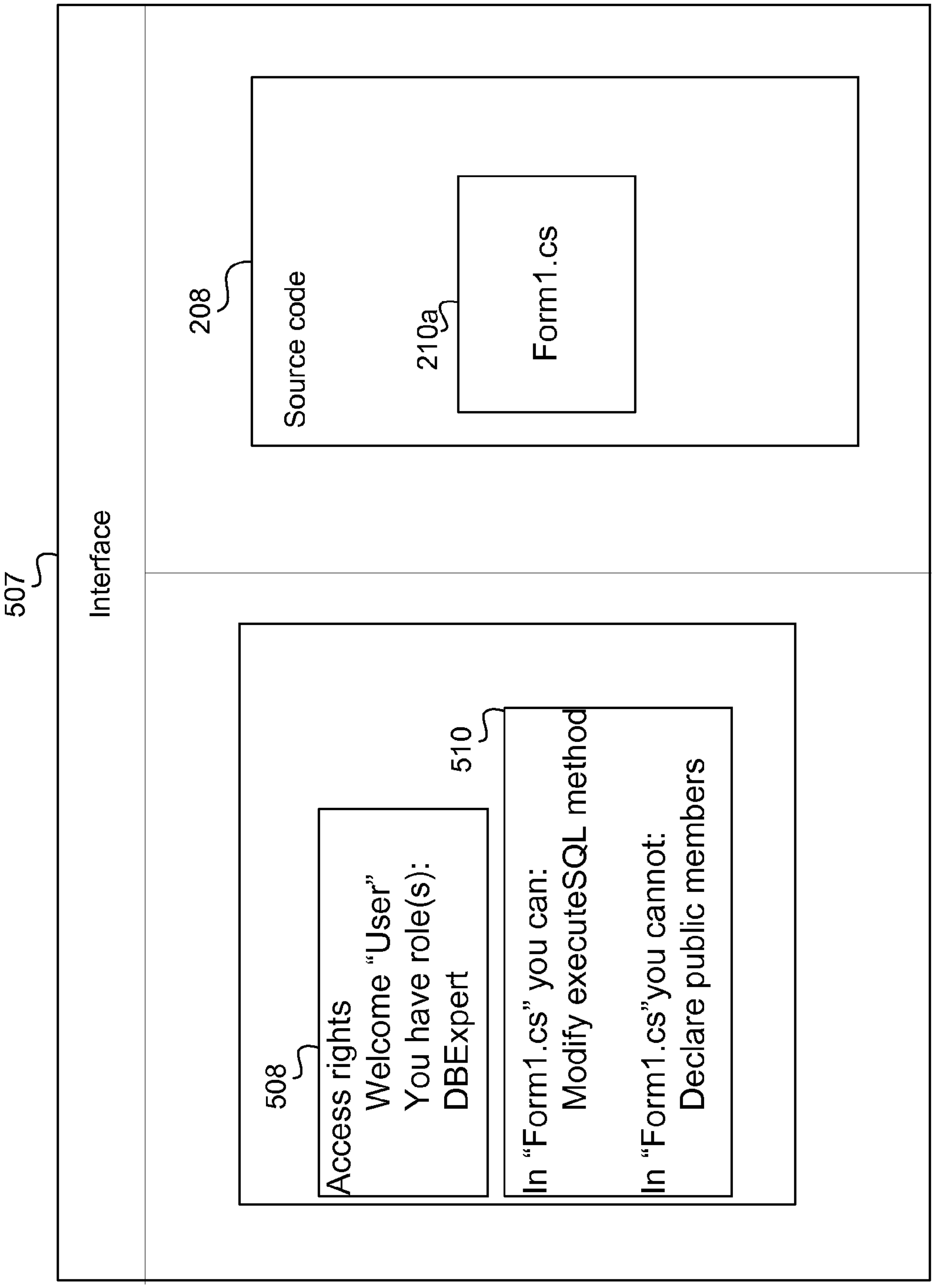
FIG. 5*d* shows an example of summarizing access rights according to one embodiment.

FIG. 5*d* shows an example of summarizing access rights according to one embodiment. The username and role are summarized at 508. At 510, a section summarizes the access rights within code block 210*a*. In this case, the user may modify the executeSQL method and cannot declare public members.

Figure 6:
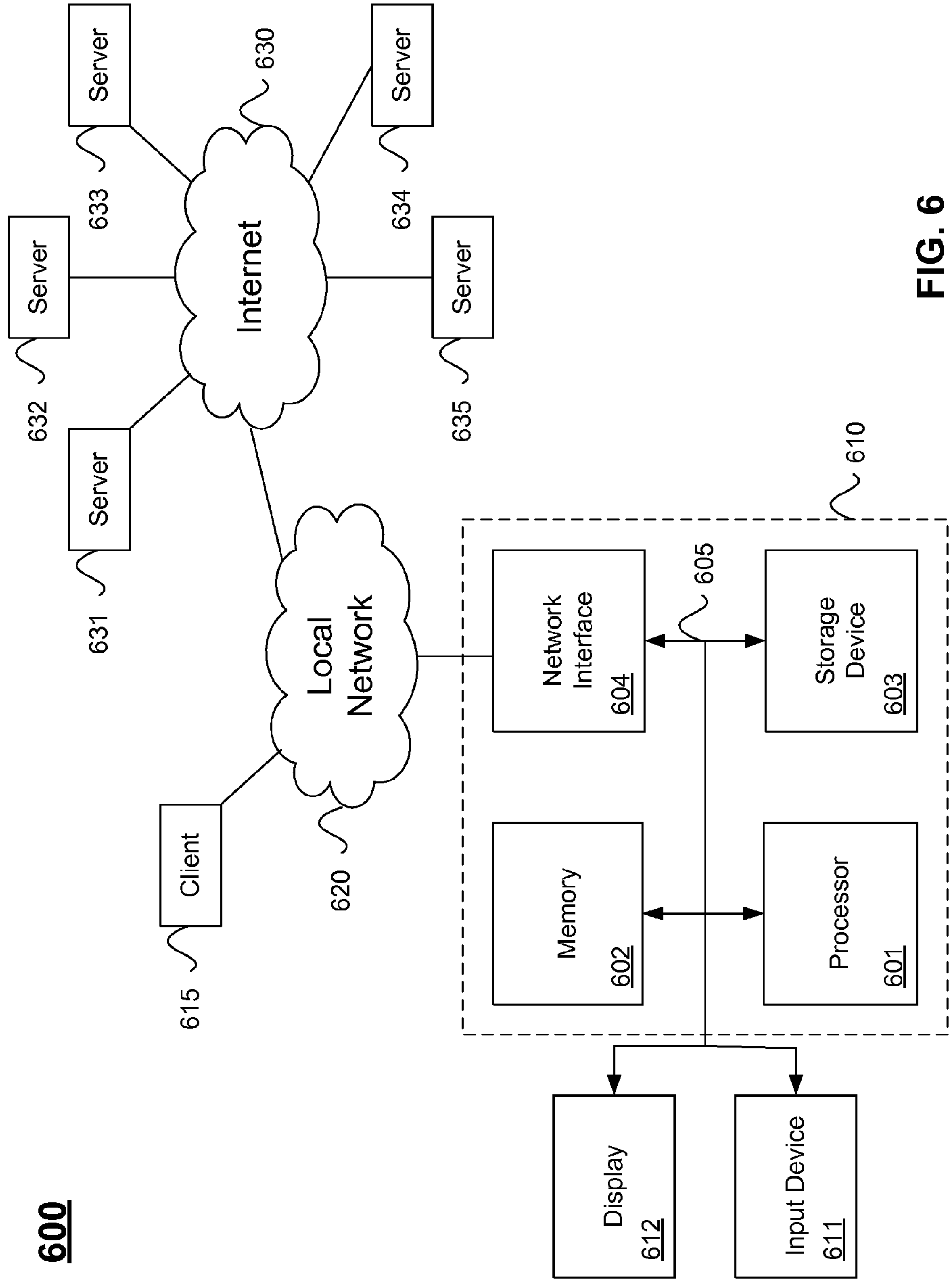
FIG. 6 illustrates hardware of a special purpose computing machine configured with access control according to one embodiment.

FIG. 6 illustrates hardware of a special purpose computing machine configured with access control according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
determining, by a computing device, a role for a user for access to software code;
determining, by the computing device, a marker associated with an instruction in the software code, wherein the marker comprises:
a type of access control; and
the role, the role being selected from a plurality of roles;
determining, by the computing device, an access level for the user based on the marker and the role; and
enforcing, by the computing device, the access level based on the instruction associated with the marker for the software code.

2. The method of claim 1, further comprising:
receiving a login from the user; and
determining the role for the user based on the login.

3. The method of claim 1, wherein enforcing comprises restricting editing to a portion of the software code based on the access level.

4. The method of claim 3, wherein restricting editing comprises restricting adding, deleting, or changing of the software code.

5. The method of claim 1, further comprising adding an indicator to a portion of the software code to indicate the access level.

6. A method comprising:
determining, by a computing device, a role for a user for access to software code;
determining, by the computing device, a marker associated with an instruction in the software code;
determining, by the computing device, an access level for the user based on the marker and the role; and
enforcing, by the computing device, the access level based on the instruction associated with the marker for the software code, wherein:
the marker is inserted with a method of the software code; and
access to the method is restricted based on the role.

7. A method comprising:
determining, by a computing device, a role for a user for access to software code;
determining, by the computing device, a marker associated with an instruction in the software code;
determining, by the computing device, an access level for the user based on the marker and the role; and
enforcing, by the computing device, the access level based on the instruction associated with the marker for the software code, wherein:
the marker is inserted with an instruction type of the software code, and
access to the instruction type is restricted based on the role.

8. A method comprising:
determining, by a computing device, a role for a user for access to software code;
determining, by the computing device, a marker associated with an instruction in the software code;
determining, by the computing device, an access level for the user based on the marker and the role; and
enforcing, by the computing device, the access level based on the instruction associated with the marker for the software code, wherein:
the marker is inserted with a class definition of the software code, and
access to an instruction used by an object instantiated from the class is restricted based on the role.

9. A method comprising:
determining, by a computing device, a role for a user for access to software code;
determining, by the computing device, a marker associated with an instruction in the software code;
determining, by the computing device, an access level for the user based on the marker and the role;
enforcing, by the computing device, the access level based on the instruction associated with the marker for the software code;
reading, by the computing device, a plurality of markers in the software code; and
determining, by the computing device, a set of access levels for the software code based on the role of the user and the plurality of markers.

10. The method of claim 9, further comprising outputting the set of access levels to the user.

11. The method of claim 9, wherein different portions of the software code have different access levels.

12. A method comprising:
determining, by a computing device, a role for a user for access to software code;
determining, by the computing device, a marker associated with an instruction in the software code;
determining, by the computing device, an access level for the user based on the marker and the role;
enforcing, by the computing device, the access level based on the instruction associated with the marker for the software code;
receiving, by the computing device, an edit to a portion of the software code covered by the access level; and
outputting, by the computing device, an indicator indicating the edit to the portion of the software code is restricted.

13. A non-transitory computer-readable storage medium containing instructions, that when executed, control a computer system to be configured to:
determine a role for a user for access to software code;
determine a marker associated with an instruction in the software code, wherein the marker comprises:
a type of access control; and
the role, the role being selected from a plurality of roles;
determine an access level for the user based on the marker and the role; and
enforce the access level based on the instruction associated with the marker for the software code.

14. The non-transitory computer-readable storage medium of claim 13, wherein configured to enforce comprises configured to restrict editing to a portion of the software code based on the access level.

15. The non-transitory computer-readable storage medium of claim 13, further configured to add an indicator to a portion of the software code to indicate the access level.

16. The non-transitory computer-readable storage medium of claim 13, wherein:
the marker is inserted with a method, an instruction type, or a class definition of the software code; and
access to the method, the instruction type, or the class definition, respectively, is restricted based on the role.

17. A non-transitory computer-readable storage medium containing instructions, that when executed, control a computer system to be configured to:

determine a role for a user for access to software code;

determine a marker associated with an instruction in the software code;

determine an access level for the user based on the marker and the role;

enforce the access level based on the instruction associated with the marker for the software code;

read a plurality of markers in the software code; and determine a set of access levels for the software code based on the role of the user and the plurality of markers.

18. The non-transitory computer-readable storage medium of claim 17, wherein different portions of the software code have different access levels.

19. A non-transitory computer-readable storage medium containing instructions, that when executed, control a computer system to be configured to;

determine a role for a user for access to software code;

determine a marker associated with an instruction in the software code;

determine an access level for the user based on the marker and the role;

enforce the access level based on the instruction associated with the marker for the software code;

receive an edit to a portion of the software code covered by the access level; and output an indicator indicating the edit to the portion of the software code is restricted.

20. An apparatus comprising:

one or more computer processors; and a non-transitory computer-readable storage medium comprising instructions for controlling the one or more computer processors to be configured to:

determine a role for a user for access to software code;

determine a marker associated with an instruction in the software code wherein the marker comprises;

a type of access control; and the role, the role being selected from a plurality of roles;

determine an access level for the user based on the marker and the role; and enforce the access level based on the instruction associated with the marker for the software code.

* * * * *